J. F. COOPER.
COLLAPSIBLE BED AND TENT FOR AUTOMOBILES.
APPLICATION FILED JULY 30, 1921.
1,404,930. 
Patented Jan. 31, 1922.
2 SHEETS—SHEET 1.
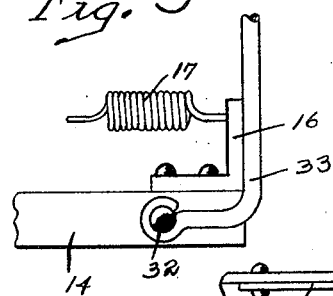
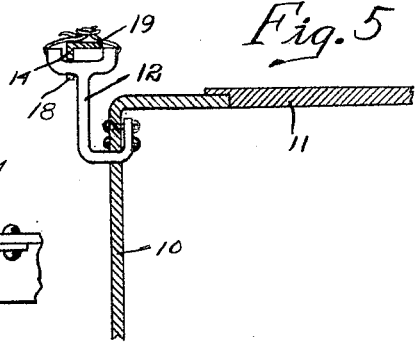
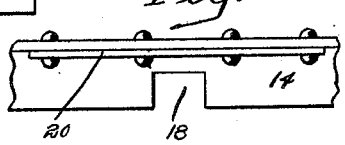
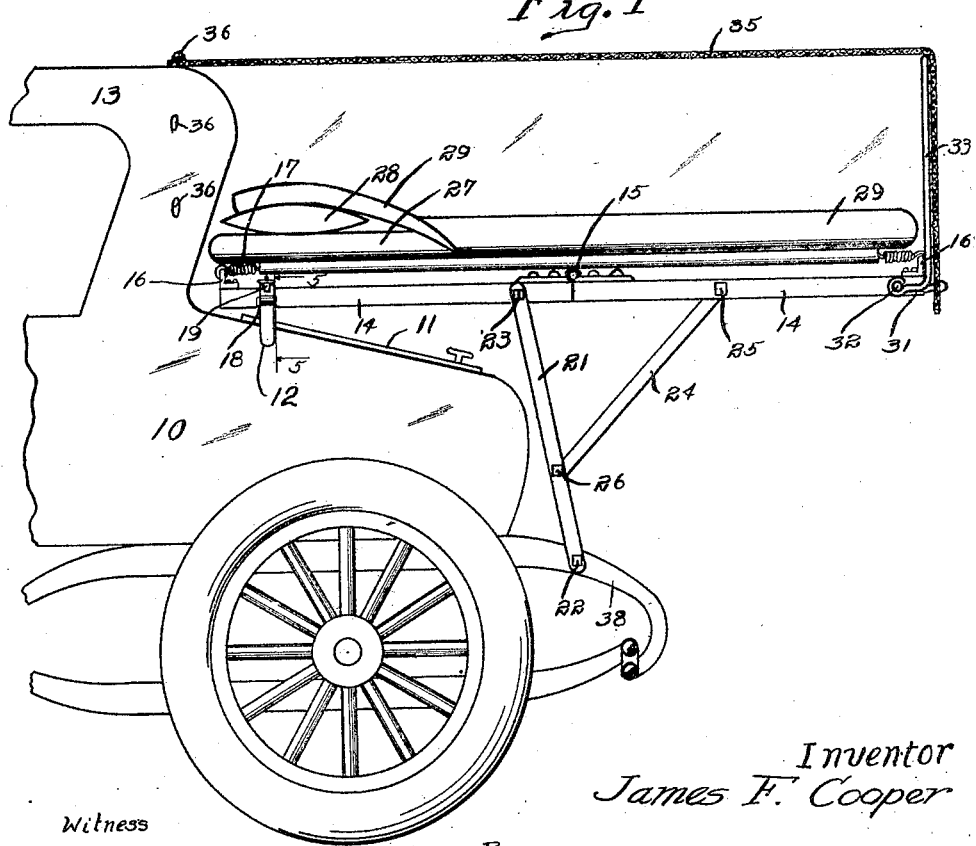
Witness
Fred Latta
Inventor
James F. Cooper
By Bair + Freeman, Attorneys

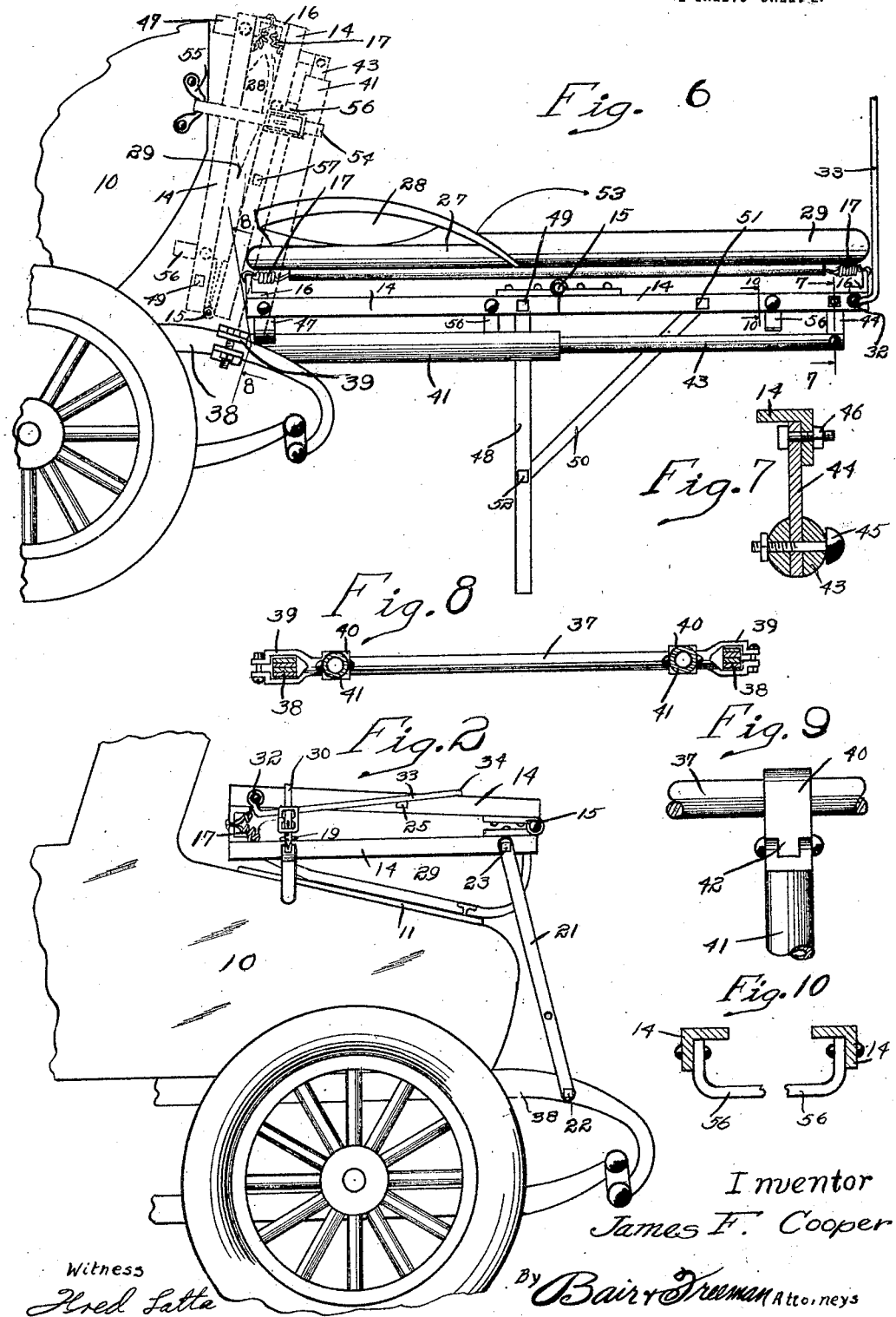

UNITED STATES PATENT OFFICE.

JAMES F. COOPER, OF HANNIBAL, MISSOURI.

COLLAPSIBLE BED AND TENT FOR AUTOMOBILES.

1,404,930.  Specification of Letters Patent.  Patented Jan. 31, 1922.

Application filed July 30, 1921. Serial No. 488,533.

*To all whom it may concern:*

Be it known that I, JAMES F. COOPER, a citizen of the United States, residing at Hannibal, in the county of Marion and State of Missouri, have invented a certain new and useful Collapsible Bed and Tent for Automobiles, of which the following is a specification.

The object of my invention is to provide an automobile bed of simple, durable and comparatively inexpensive construction.

More particularly my invention relates to a collapsible bed adapted to be secured to automobiles, which bed may be folded for occupying a minimum amount of space when not in use.

Still another object is to provide a covering member or tent for the bed which may be readily and easily placed in position over the bed.

Still another object is to provide a bed which may be folded together with all of the contents therein so that when the bed is unfolded it is ready for use.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a side elevation of my improved auto bed and tent therefor, placed in operative position on the automobile.

Figure 2 is a side elevation of the same with the bed collapsed and in inoperative position.

Figure 3 is a detail view of a portion of the tent frame for the bed.

Figure 4 is a detail view of a portion of the bed frame.

Figure 5 is a sectional view taken on the line 5—5 of Figure 1, showing one of the supports for the bed frame.

Figure 6 is a slightly modified form of bed applied to a touring type of automobile.

Figure 7 is a detail, sectional view taken on the line 7—7 of Figure 6.

Figure 8 is a sectional view taken on the line 8—8 of Figure 6.

Figure 9 is a detail view of a portion of the device of the form shown in Figure 6; and Figure 10 is a sectional view showing one of the brackets for holding the two angle iron frames of the bed together.

In the accompanying drawings I have used the reference numeral 10 to indicate generally an automobile of the roadster type which is provided with a hinged door member 11 whereby access may be had into the back compartment of the roadster automobile when desired.

Secured to the automobile 10 is a bracket member 12 which is ordinarily designed to receive the frame members of the automobile top 13 when they are in their laid-down position.

My improved bed includes a pair of spaced angle irons 14. The angle irons 14 are cut at their center and are secured together by means of a hinge member 15. The free ends of the angle irons are connected together by angle irons 16 which hold the free ends of the angle irons 14 together.

The angle irons 14 and 16 form what I call the bed frame.

Secured to the angle irons 16 is an ordinary bed spring 17 which is preferably formed of coil springs and wire bands of the ordinary construction.

The forward ends of the angle irons 14 are provided with a notch 18, which notch 18 receives a part of the brackets 12. The forward end of the bed frame is thereby secured to the automobile 10.

A strap 19 is extended around the bracket and around the forward ends of the bed frame for securely holding the bed frame in position.

In order to reinforce the angle irons 14 adjacent to the notch 18 I provide a strip of material 20 which is riveted to the angle irons 14 as clearly shown in Figure 4 of the drawings.

In order to support the bed in position, I provide brace members 21 which have their lower ends bolted to the automobile frame by means of the bolts 22 and their upper ends secured to the forward half of the angle irons 14 by means of the bolts 23.

From the construction of the parts just described it will be seen that the brackets 12 and the braces 21 securely hold the bed frame forward of the hinges 15 in proper position.

In order to securely hold the rear half of the bed frame in position I provide the short braces 24 which are pivotally secured to the rear half of the angle irons 14 by means of the bolts 25.

The lower ends of the braces 24 are secured to the brace 21 by means of the bolt 26 as clearly shown in Figure 1 of the drawings.

A mattress 27 is shown on the bed springs 17; a pillow 28 and blankets 29 are also provided for completing the bed.

When the bed is in the position shown in Figure 1 of the drawings, it will be seen that the rear half of the bed frame does not support as much weight as the forward half of the bed frame, due to the fact that the occupiers of the bed sleep with their heads towards the back of the automobile.

When the bed is not desired the bolt 26 is released, which permits the brace 24 to swing to position substantially parallel with the rear half of the angle irons 14. The entire bed contents and rear half of the bed frame may then be swung to position as clearly shown in Figure 2 of the drawings. A strap 30 may be extended around the angle irons of the bed frame for holding them in their inoperative position.

In order to form a canopy or tent for the bed frame, I provide a rod 31 which is pivoted to the rear end of the angle irons 14 at 32. The rod 31 is substantially U-shaped so as to provide a pair of upwardly extending arms 33 and a cross piece 34 for connecting the upper ends of the arms 33.

The rod member 31 is so arranged that when it is in its raised position it will rest against the rear angle iron 16.

A canvas covering 35 is extended from the top 13 of the automobile, over the rod 31. The automobile top may be provided with fastening devices 36 whereby the top and sides of the canvas covering 35 may be secured at its forward end.

The canvas covering when secured to the fastening devices 36 will hold the rod 31 in its raised position.

The canvas covering 35 is provided with a top and a pair of sides as well as one end so as to form a complete covering for the bed.

When it is desired to fold the bed up the canvas covering 35 is removed and placed on the blankets of the bed; the rod 31 is folded to position shown in Figure 2 of the drawings. The brace 24 is detached from the brace 21 whereby the entire rear half of the bed and the frame therefor may be folded upon the other, as clearly illustrated in Figure 2 of the drawings.

In Figure 6 I have shown a slightly modified form of bed whereby it may be secured to an automobile of the touring type. In this form of device I provide a cross bar 37 extended transversely between the rear ends of the automobile frame 38.

The ends of the cross bar 37 are provided with a pair of clamp members 39 whereby the rod 37 may be secured to the frame 38 as clearly shown in Figure 8 of the drawings.

Secured to the rod 37 are a pair of arms 40 which arms are provided with tubes 41 which are pivotally secured to said arms at 42.

Slidably mounted within the tubes 41 are the shafts 43. The shafts 43 are bifurcated at their extreme rear ends so as to permit the plates 44 to be received therein. The plates 44 are secured to the bifurcated shafts 43 by means of the bolts 45.

The bed used in this form of device is the same as that heretofore described and clearly shown in Figure 1 of the drawings.

The upper end of the plates 44 are bolted to the angle irons 14 of the bed frame by means of the bolts 46.

The extreme forward ends of the angle irons 14 of the bed frame are provided with a pair of blocks 47 which blocks rest substantially adjacent to the forward ends of the tubes 41.

A brace 48 is bolted to the angle irons 14 just forward of the hinge 15 by means of a bolt 49. The brace 48 rests upon the ground for supporting the bed frame near its center.

A brace 50 bolted to the rear half of the angle irons 14 by means of a bolt 51 is detachably secured to the brace 48 by means of a bolt 52.

From the construction of the parts just described it will be seen that the forward half of the bed frame is supported by the tubes 41 and the blocks 47 at their forward ends, the brace 48 supporting the rear end of the forward half of the bed frame.

When it is desired to collapse the bed frame the forward half is swung over in the direction indicated by the arrow 53 until it rests upon the rear half of the bed frame; the bolt 52 having been detached permits the brace 48 to move to position substantially parallel with the forward half of the angle irons 14.

The entire bed frame may then be moved forwardly by permitting the shaft 43 to slide within the tube 41; the entire bed may then be swung upon the pivot 42 by moving the parts to position shown in Figure 2 of the drawings.

A strap 54 shown in dotted lines may be secured to the hook 55 for holding the bed in its inoperative position.

In order to hold the bed springs and mattress in position when the parts are in their folded position, I provide a pair of cross bars 56 which are bowed at their centers, which cross bars are secured to the angle irons 14. The cross bars 56 hold the mattress and bed springs in proper position when the parts are folded up.

It will be seen that I have provided an automobile bed of simple construction, and which can readily and easily be opened or closed, as desired.

Some changes may be made in the construction and arrangement of the parts of my device without departing from the real spirit and purpose of my invention, and it is my intention to cover by my claim, any modified forms of structure or use of mechanical equivalents, which may be reasonably included within its scope.

I claim as my invention:

In a device of the class described adapted to be used in combination with an automobile, a bed including a telescoping frame member secured at one end to the automobile, a two-part bed frame hinged at their abutting edges supported on said telescoping frame, a support secured to one of said parts and a brace secured to said support and to the other of said parts of the bed frame, the parts being so arranged that half of the bed may be folded over on the remainder of the bed and then the telescoping frame telescoped and the entire bed then swung to position adjacent to the back of an automobile for the purposes stated.

Des Moines, Iowa, July 19th, 1921.

JAMES F. COOPER.